United States Patent
Iida et al.

(10) Patent No.: US 12,529,594 B2
(45) Date of Patent: Jan. 20, 2026

(54) COHERENT OPTICAL MEASURING DEVICE FOR FACILITY LINE TEST

(71) Applicant: NTT, Inc., Tokyo (JP)

(72) Inventors: Daisuke Iida, Musashino (JP);
Yoshitaka Enomoto, Musashino (JP);
Chihiro Kito, Musashino (JP); Tatsuya Okamoto, Musashino (JP); Yusuke Koshikiya, Musashino (JP); Yoshifumi Wakisaka, Musashino (JP); Nazuki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 212 days.

(21) Appl. No.: 18/275,848

(22) PCT Filed: Feb. 26, 2021

(86) PCT No.: PCT/JP2021/007519
§ 371 (c)(1),
(2) Date: Aug. 4, 2023

(87) PCT Pub. No.: WO2022/180834
PCT Pub. Date: Sep. 1, 2022

(65) Prior Publication Data
US 2024/0118127 A1    Apr. 11, 2024

(51) Int. Cl.
*G01H 9/00* (2006.01)
(52) U.S. Cl.
CPC .................... *G01H 9/004* (2013.01)
(58) Field of Classification Search
None
See application file for complete search history.

(56) References Cited

U.S. PATENT DOCUMENTS

| | | | | |
|---|---|---|---|---|
| 2021/0003474 A1* | 1/2021 | Koshikiya | .......... | G01M 11/3145 |
| 2021/0255005 A1* | 8/2021 | Okamoto | .......... | G01D 5/35358 |
| 2022/0155139 A1* | 5/2022 | Wakisaka | .......... | G01D 5/35383 |

FOREIGN PATENT DOCUMENTS

| | | | |
|---|---|---|---|
| JP | 2017-026503 A | | 2/2017 |
| JP | 2019078637 A | | 5/2019 |
| JP | 2020-052030 A | | 4/2020 |
| JP | 2020-169904 A | | 10/2020 |

(Continued)

OTHER PUBLICATIONS

Iida Daisuke et al: "Advances in distributed vibration sensing for optical communication fiber state visualization", Optical Fiber Technology, vol. 57, Jul. 1, 2020 (Jul. 1, 2020), Amsterdam, NL, pp. 102263, XP093036976, ISSN: 1068-5200, DOI: 10.1016/j.yofte. 2020.102263 * (Year: 2020).*

(Continued)

*Primary Examiner* — Eric S. McCall
*Assistant Examiner* — Nigel H Plumb

(57) ABSTRACT

The present disclosure is an optical line test system that detects a distribution of loss points of an optical line in a longitudinal direction, using a coherent light measurement device, applies vibration to facility disposed on a path of the optical line, detects a vibration point of the optical line in a longitudinal direction upon applying the vibration, using the coherent light measurement device, and identifies the loss point based on correspondence between the detected loss point and vibration point.

8 Claims, 7 Drawing Sheets

(56) References Cited

FOREIGN PATENT DOCUMENTS

| WO | WO-2019172276 A1 | 9/2019 |
| WO | 2020/026199 A1 | 2/2020 |

OTHER PUBLICATIONS

"Overview of Optical Test Module (OTM)", ANSL R&D Times, No. 33, 2003, https://www.ansl.ntt.co.jp/j/times/033/02/02.html with English captions.
"Immersion Detection Technology", ANSL R&D Times, No. 58, 2009, https://www.ansl.ntt.co.jp/j/times/058/01/01.html with English captions.
Daisuke Etal: "Advances in distributed vibration sensing for optical communication fiber state visualization", Apr. 28, 2020.
Merlo Sabina Etal: ""Runways ground monitoring system by phase-sensitive optical-fiber OTDR"", 2017.

\* cited by examiner

COHERENT OPTICAL MEASURING DEVICE FOR FACILITY LINE TEST

CROSS-REFERENCE TO RELATED APPLICATIONS

This application is a 371 U.S. National Phase of International Application No. PCT/JP2021/007519, filed on Feb. 26, 2021. The entire disclosure of the above application is incorporated herein by reference.

TECHNICAL FIELD

The present disclosure relates to systems and methods for testing optical lines.

BACKGROUND ART

An optical fiber line test system detecting an abnormal point, at which loss or reflection occurs, using measurement of a backscattered light distribution of an optical fiber has been proposed (see, for example, Non Patent Literature 1), and a technology for identifying a facility position using an optical fiber vibration sensor has been proposed (see, for example, Patent Literature 1).

In using the facility position identifying principle of Patent Literature 1, when the vibration of a communication optical fiber is measured from building to which optical fibers converge using an optical fiber vibration sensing device and at the same time a manhole cover is struck, the striking vibration and the location thereof can be detected, and the existence of the communication optical fiber under the ground and comparing between the manhole position and the fiber route map can be confirmed without opening the manhole.

As a result of various needs and expansion of a use scale, a more flexible wired network configuration has been required, and therefore longer distance wiring and a large number of communication facilities have been used, and efficiency of maintenance and operation work thereof has been required. In addition, although the social importance of wireless communication such as 5G is increasing, the wiring of a base station therefor is a wired network. In most cases, a radio base station is open by overhead wiring. In the case of a base station installed on a rooftop of a building, reaching thereto is performed via wiring on the premises. Therefore, it is necessary to enhance the monitoring/fault isolation function of all communication wiring facilities including overhead wiring, overhead relay, and wiring on the premises.

Regarding a long-distance optical fiber line including an overhead line, the optical line test of Non Patent Literature 1 is not always measurable up to the far end. In this case, since the line test itself is a simple optical time domain reflectometer (OTDR) of direct detection, there is a problem that the SN is not large and the measurement distance is relatively short.

In addition, when a large loss or reflection occurs, the test light becomes very weak at a position farther away than this position. In this case, in the face of large loss or reflection occurring at two or more locations, there is a problem that only one point can be detected.

In addition, even though the distance to the abnormal position is known, there are many errors in the distance, and/or there is a problem that abnormalities such as disconnection cannot be found by visual inspection in the overhead facility and the underground facility due to existence of many manholes, utility poles, manhole closures, and the like in the vicinity of the site.

CITATION LIST

Patent Literature

Patent Literature 1: JP 2020-052030 A
Patent Literature 2: JP 2017-026503 A
Patent Literature 3: JP 2020-169904 A

Non Patent Literature

Non Patent Literature 1: "2. Overview of Optical Test Module (OTM)," ANSL R&D Times, No. 33, 2003_06, https://www.ansl.ntt.co.jp/j/times/033/02/02.html
Non Patent Literature 2: "1. Immersion Detection Technology," ANSL R&D Times, No. 58, 2009_01, https://www.ansl.ntt.co.jp/j/times/058/01/01.html

SUMMARY OF INVENTION

Technical Problem

An object of the present disclosure is to enable testing of a long-distance optical fiber line and detecting of distances to a plurality of abnormal facilities.

Solution to Problem

In the present disclosure, a long-range loss distribution is measured by time-averaging single measurement results of an optical fiber line by an OTDR device that performs coherent detection, and a vibration distribution is measured by arranging the long-range loss distribution in time series.

The optical line test system and method of the present disclosure each include
  detecting a distribution of loss points of an optical line in a longitudinal direction, using a coherent light measurement device,
  applying vibration to facility disposed on a path of the optical line,
  detecting a vibration point of the optical line in a longitudinal direction upon applying the vibration, using the coherent light measurement device, and
  identifying the loss point based on correspondence between the detected loss point and the vibration point.

A coherent detection device of the present disclosure is a coherent OTDR for performing coherent detection, the device includes
  measuring a distribution of the loss points by time-averaging a plurality of backscattered light waveforms obtained by a plurality of light pulses,
  measuring the vibration point by arranging the plurality of backscattered light waveforms obtained by the plurality of light pulses in accordance with time series, and
  determining whether the loss point and the vibration point correspond or do not correspond.

Advantageous Effects of Invention

According to the present disclosure, it is practicable to test a long-distance optical fiber line and detect distances to a plurality of abnormal facilities.

DESCRIPTION OF EMBODIMENTS

Figure 1:
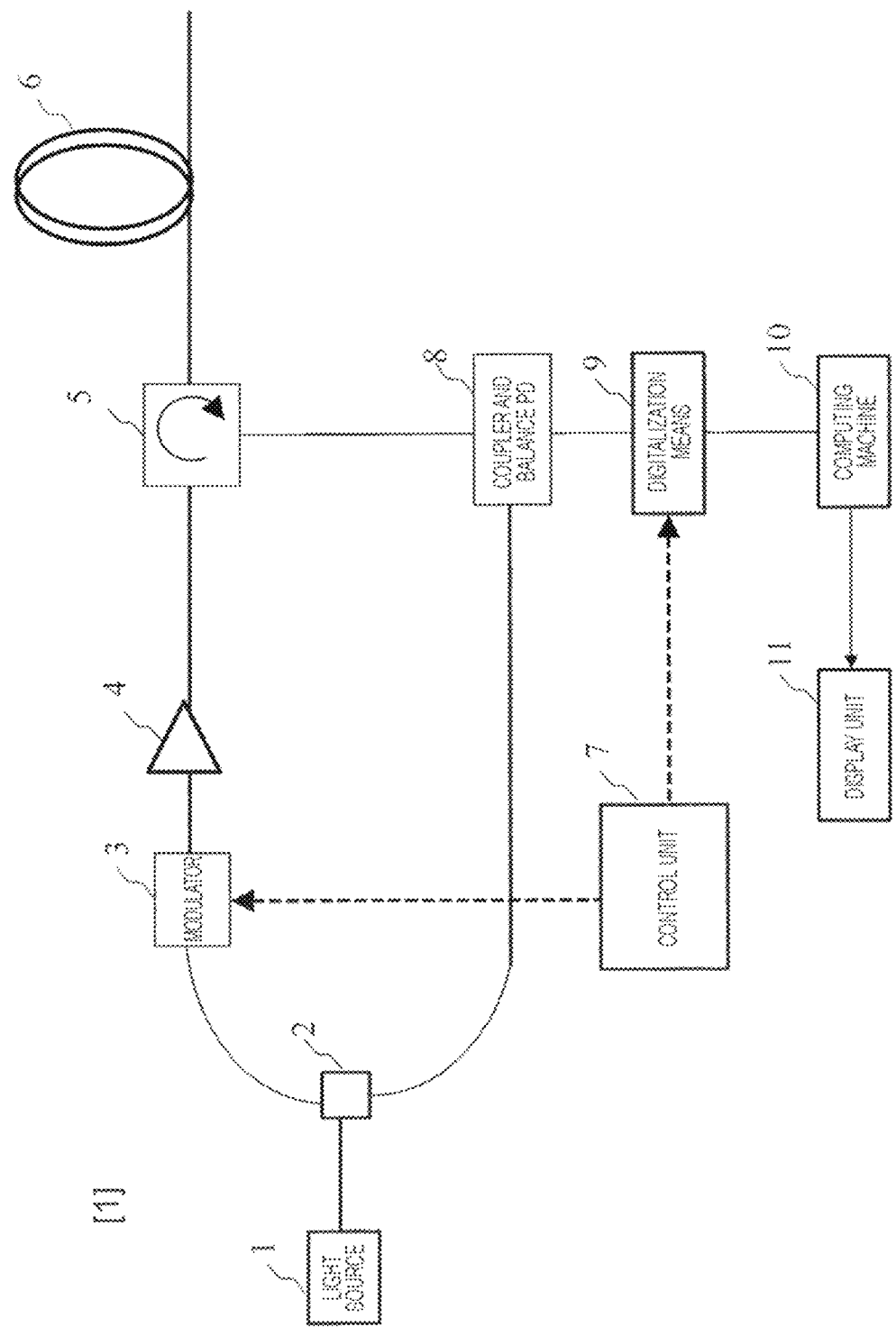
FIG. 1 illustrates a configuration example of a coherent OTDR.

The following is a detailed description of embodiments of the present disclosure, with reference to the drawings. The present disclosure is not limited to the embodiments described below. These embodiments are merely an example, and the present disclosure can be carried out in forms with various modifications and improvements based on knowledge of those skilled in the art. Note that components equivalent to each other are denoted by a common reference numeral in this specification and the drawings.

Embodiment 1

The optical line test system of the present disclosure includes a coherent light measurement device capable of coherent detection at any point of the optical line in the longitudinal direction. In the present embodiment, as an example of the measurement technique, an example, using a coherent OTDR that performs coherent detection, will be described.

FIG. 1 illustrates a configuration example of a coherent OTDR. Reference numeral 1 is a light source that emits coherent light. The light from the light source 1 is branched by an optical coupler 2, one of the branched portions is modulated by a modulator 3 to generate a frequency-modulated light pulse, and the light pulse is amplified by an amplifier 4. The amplified light pulse enters an optical fiber 6 through a circulator 5. The optical fiber 6 is an optical line to be tested, and is also referred to as an optical fiber under test (FUT).

Scattered light and reflected light from the optical fiber 6 return to the circulator 5, are multiplexed with the other of the branched portions by the optical coupler 2, and are coherently detected by a balance PD 8. The signal coherently detected is converted into digital data by digitalization means 9 and subjected to numerical calculation processing by a computing machine 10. A control unit 7 controls the modulator 3 and the measurement timing. The control unit 7, the digitalization means 9, the computing machine 10, and a display unit 11 can also be implemented by a computer and a program, and the program can be recorded in a recording medium or provided through a network.

Figure 2:
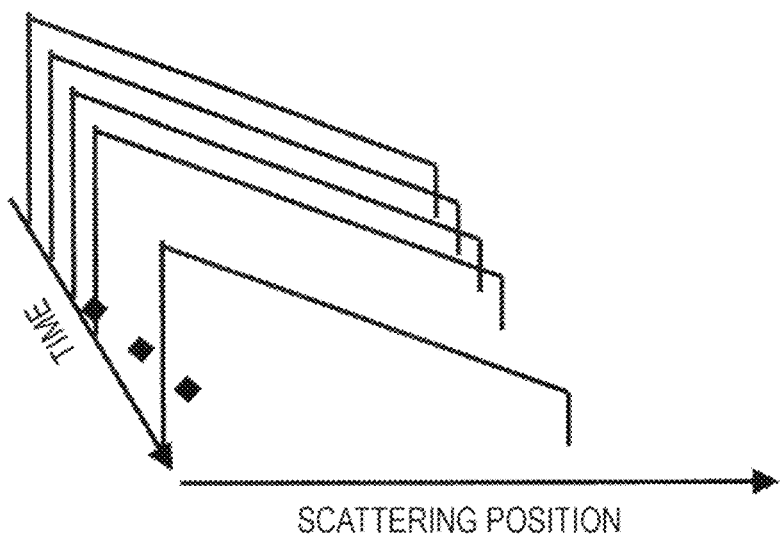
FIG. 2 illustrates an example of a backscattered light waveform.

By the OTDR that performs coherent detection, the backscattered light waveform as illustrated in FIG. 2 can be acquired so as to be restricted to that of the incident light pulse. Here, it is also possible to increase the number of samples of the backscattered light waveform by frequency multiplexing the frequency of the light pulse by the modulator 3. In addition, the coherent detection in the balance PD 8 is heterodyne detection because the frequency modulation is performed by the modulator 3. Here, if the modulator 3 does not perform frequency modulation, homodyne detection is performed. The coherent detection here may be homodyne detection in which such frequency modulation in the modulator 3 is not performed.

The backscattered light waveform is a time waveform, and an average of a plurality of backscattered light waveforms, obtained by a plurality of light pulses, is a waveform obtained by a so-called coherent OTDR, and enables measurement at a high SN ratio.

In addition, by arranging the backscattered light waveforms in the respective light pulses in accordance with time-series pulse numbers before averaging, it is practicable to measure the change over time of the scattered light at each scattering position, that is, the vibration. In the frequency multiplexing, the techniques of Patent Literature 2 and Patent Literature 3 can be used. For example, a frequency multiple averaging method in consideration of phase rotation described in Patent Literature 3 may be adopted.

In the OTDR configuration in which the coherent detection is performed as described above, it is practicable to measure the long-range loss distribution on average and to measure the vibration distribution in accordance with time series, with respect to a single measurement result. In the present disclosure, it is practicable to detect the distance to the abnormal facility by applying vibration to the facility laid on the optical fiber 6 and detecting the vibration. Here, in the present disclosure, the struck facility is any facility laid on the optical fiber 6, and for example, at least one of a closure, a utility pole, or a manhole can be exemplified.

Embodiment 2

In the present embodiment, an optical line test method executed by the optical line test system will be described. In the present embodiment, an example of bending loss due to water immersion in using the water immersion detection module will be described as an example of comparing with the facilities in the site.

Figure 3:
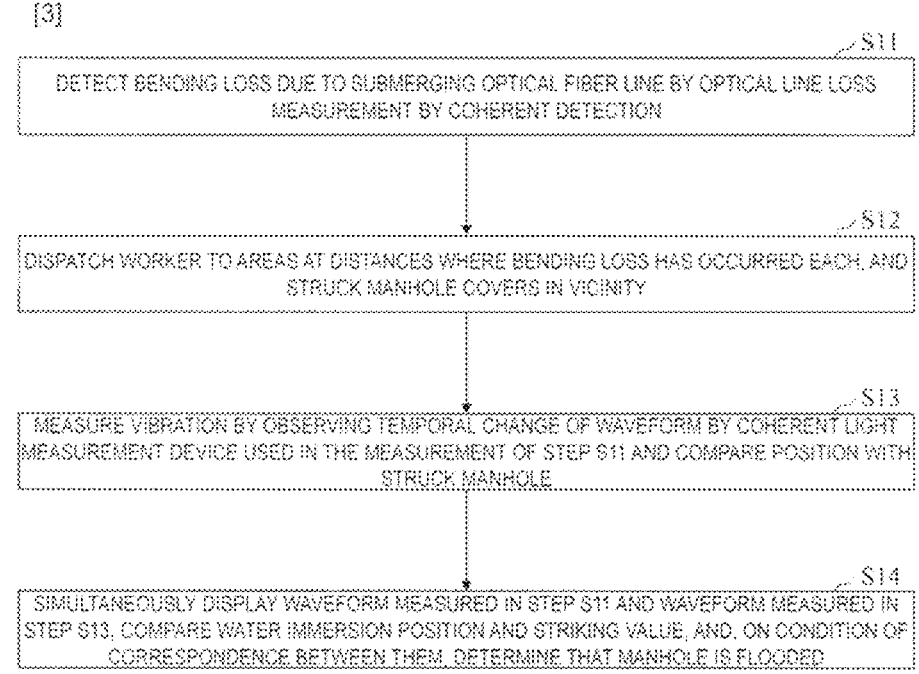
FIG. 3 illustrates an example of an optical line test method of the present embodiment.

FIG. 3 illustrates an example of an optical line test method of the present embodiment. The optical line test method according to the present embodiment includes steps S11 to S14.

Figure 4:
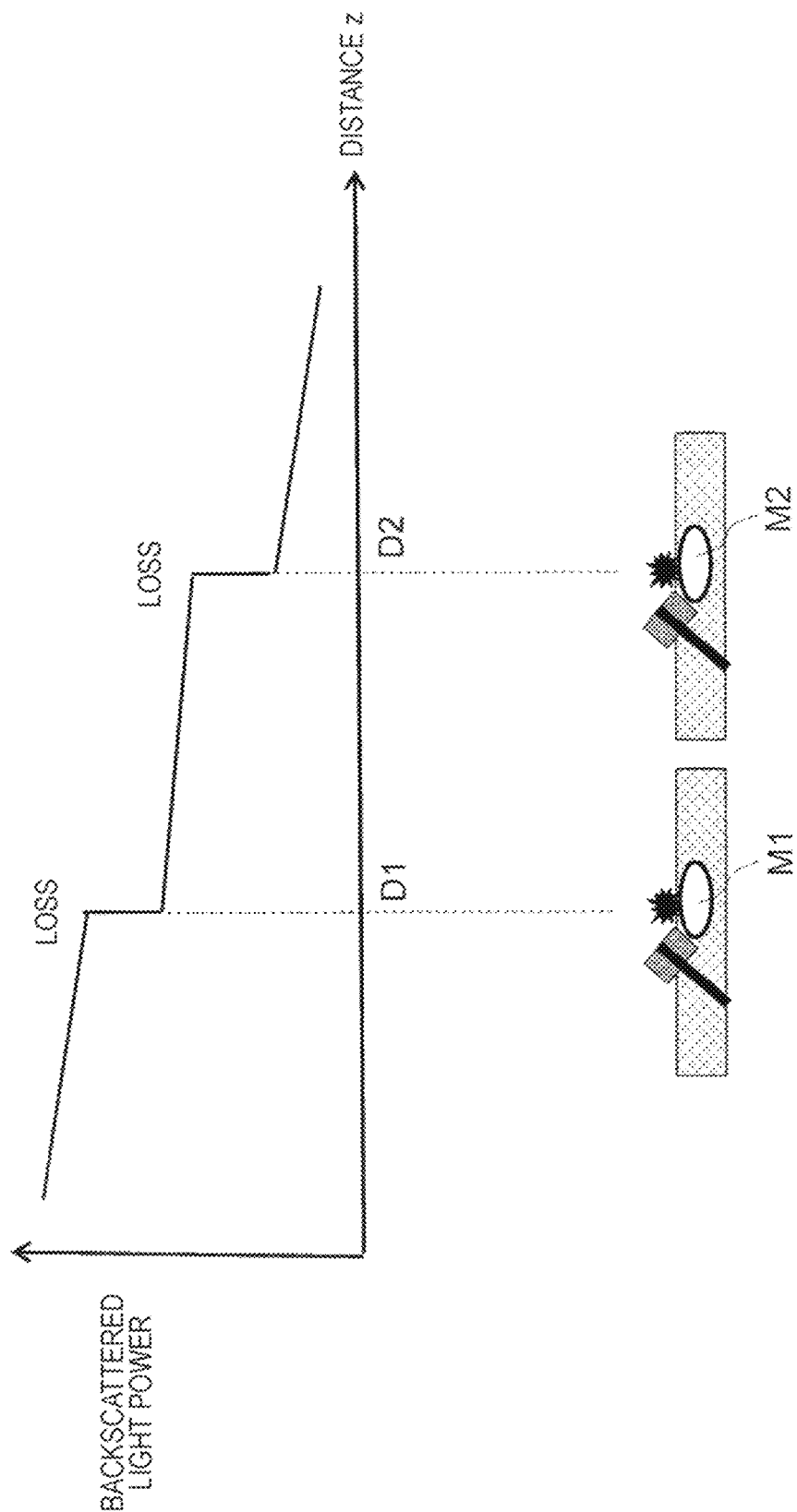
FIG. 4 illustrates an example of an optical line loss measurement result.

Step S11: A bending loss due to submerging the optical fiber 6 is detected by optical line loss measurement by coherent detection. FIG. 4 illustrates an example of an optical line loss measurement result. In the optical line loss measurement result, the distribution of the loss points of the optical fiber 6 in the longitudinal direction is displayed on the display unit 11. For example, when the bending loss occurs at distances D1 and D2 from the coherent light measurement device, the backscattered light power decreases at the distances D1 and D2. Here, in the present disclosure, since the coherent detection is used, the measurement distance range can be expanded, and the loss at a plurality of points can be measured.

Figure 5:
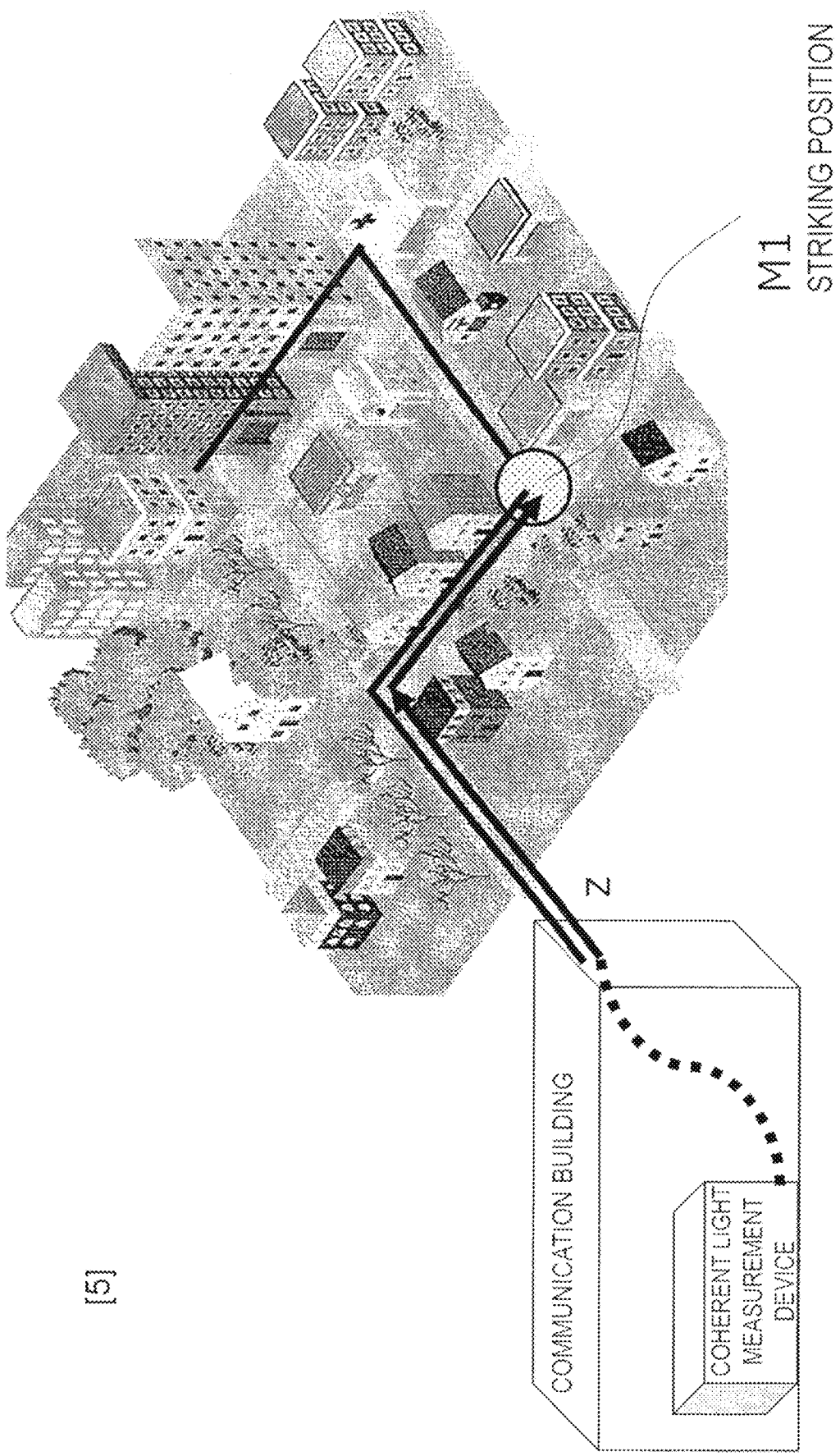
FIG. 5 illustrates an example of a striking position.

Step S12: A worker is dispatched to areas at the distances D1 and D2 where the bending loss has occurred each, and manhole covers M1 and M2 in the vicinity are struck. For example, as illustrated in FIG. 5, the manhole M1, arranged in an area at the distance D1 from the coherent light measurement device, is struck.

Step S13: The coherent light measurement device, used in the measurement of step S11, measures the vibration of the optical fiber 6 by observing the temporal change of the waveform, and identifies the position of the struck manhole. For example, the vibration at the distance D1 is detected by measuring the temporal change of the backscattered light waveform at the distance D1, using the backscattered light waveform before averaging.

Figure 6:
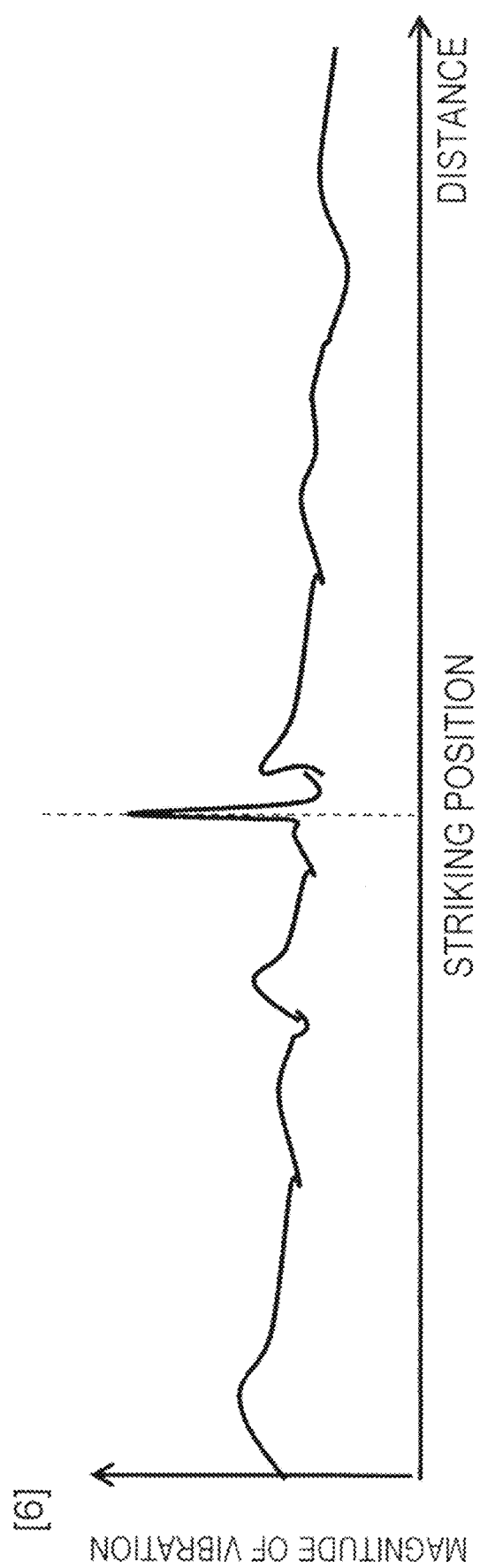
FIG. 6 illustrates a detection example of vibration obtained by striking a manhole.

FIG. 6 illustrates a detection example of vibration obtained by striking a manhole. When the optical fiber 6 is laid under the manhole, vibration is detected at the position of the manhole. In the present embodiment, since the coherent light measurement device, arranged at the same position as that of step S11, detects vibration, the position of the manhole corresponds with the distance in the longitudinal direction of the optical fiber 6 from the coherent light measurement device to the manhole in step S11. As a result, it is practicable to detect a vibration point of the optical fiber 6 in the longitudinal direction.

Step S14: The waveform measured in step S11 and the waveform measured in step S13 are simultaneously displayed on the display unit 11, the loss point and the vibration point are compared, and, on condition of correspondence between the points, it is determined that the manhole is flooded. For example, when the vibration point detected in the step S13 corresponds with the distance D1 in which the loss has occurred, it is determined that the struck manhole M1 is a flooded manhole in which a bending loss has occurred, and the determination result is displayed on the display unit 11.

Figure 7:
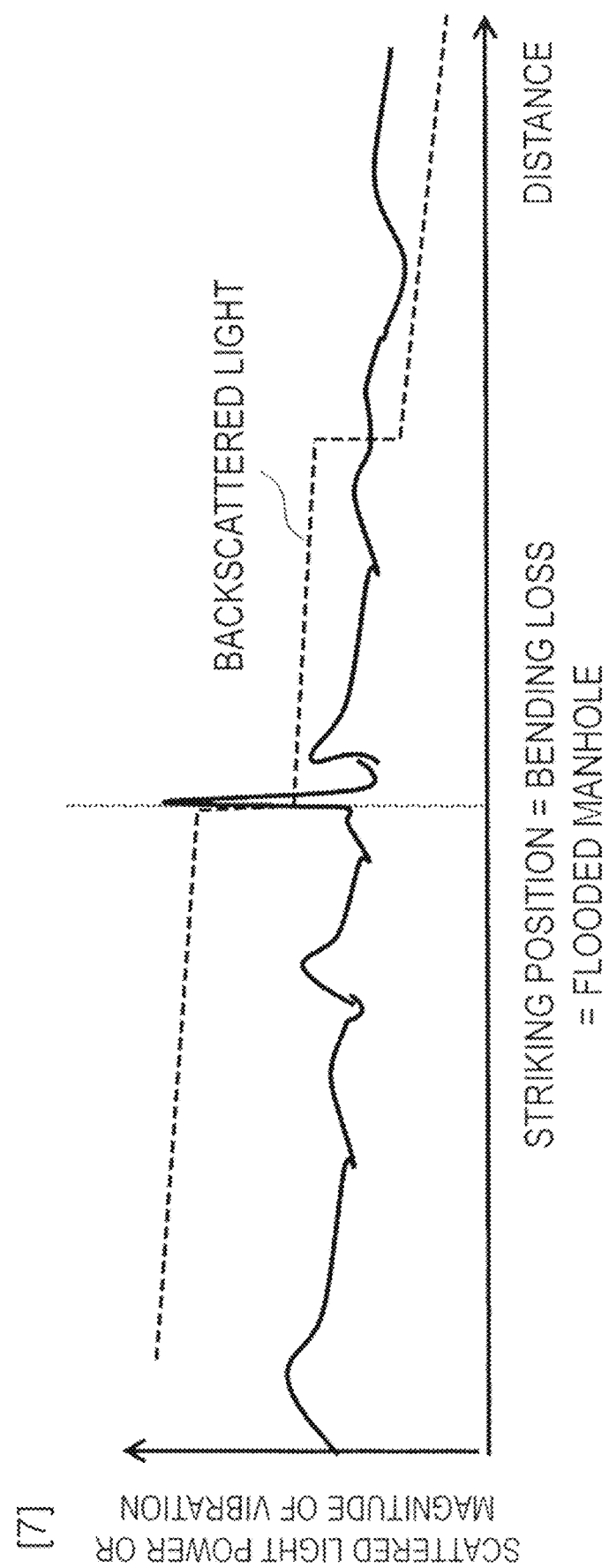
FIG. 7 illustrates an example of display in the coherent light measurement device.

FIG. 7 illustrates an example of display in the coherent light measurement device. Since the coherent light measurement device measured in step S11 is used, measurement can be performed in the same measurement distance range. Therefore, as illustrated in FIG. 7, the magnitude of the vibration and the backscattered light power are displayed in the same measurement distance range on the display unit 11. At this time, the time when the worker strikes may be recorded by the worker and displayed on the display unit 11. As a result, the backscattered light waveform and the vibration detection time are compared, so that the determination can be made more accurately.

As described above, the system and method of the present disclosure can achieve both range expansion by coherent measurement and loss measurement and vibration measurement with the same device.

In the present embodiment, step S13 is executed after step S11, but these may be simultaneous measurement.

In addition, in step S13, the computing machine 10 may automatically detect a waveform change, due to vibration, in digital data, and in step S14, the computing machine 10 may automatically compare the vibration point and the loss point. In addition, the detection result of the vibration and the display of the backscattered light waveform may be superimposed as illustrated in FIG. 7, or may be arranged side by side. In addition, the output result may be a waveform as illustrated in FIG. 7 or only correspondence or incongruity with each striking position.

In addition, the coherent light measurement device may have a communication function, and it is also possible to transmit information to a site worker who has been struck and check the information on the site with a certain terminal such as a smartphone or a tablet. The information is, for example, a detection result of a loss point, a detection result of a vibration point, or a result of comparison between the loss point and the vibration point. Further, the coherent light measurement device may operate in accordance with an instruction from the terminal of the site worker. As a result, the operator who performs the striking in step S12 can remotely perform the operations in steps S11, S13, and S14, so that all the operations can be performed at the same time on site.

Embodiment 3

In the present embodiment, detection of a connection loss, a breaking loss, and abnormal reflection at a connection part of the optical fiber 6 will be described.

Steps S11 and S13 are the same as those in Embodiment 2.

In step S12, a utility pole or a manhole is struck.

In step S14, the loss point detected in step S11 and the vibration point detected in step S13 are compared with each other to identify loss facility (a utility pole or a manhole having a closure with an abnormal connection).

Embodiment 4

When the facility of Embodiment 2 is a closure in an underground manhole, there may be multiple closures under the manhole. In this case, each closure is struck in step S12. As a result, the vibration is detected for each closure in step S13, and the closure in which the vibration is detected and the optical fiber in which the loss is detected in step S14 are compared with each other. This allows a lossy closure to be identified.

(Outline and Points of Present Technology)

The optical line test system of the present disclosure makes the measurement technique coherent, expands a measurable dynamic range, and enables a long measurement distance and low power scattered light reception withstandable against a plurality of abnormalities.

On the basis of dynamic distortion (vibration) sensing using coherent detection, the vibration point of the optical line, by means of externally striking on facility arranged on the path of the optical line, is detected, and a distance to an abnormal point on the optical test and the facility at the struck site are compared. The sensitivity is improved by the vibration sensing for measuring the phase by the coherent detection, and the vibration is detectable even though there are a plurality of losses and reflections.

The above two measurements can be realized by the same hardware, and can be performed simultaneously by performing one measurement and two processes based on the result thereof.

By performing the above two measurements with one device and displaying them on the same screen, it is practicable to simultaneously identify a plurality of abnormal positions and identify work facility on site.

The checkable information may be a waveform itself or a comparing result.

It is also possible to adopt a structure capable of controlling the coherent light measurement device from the struck site. For example, the coherent light measurement device detects a distribution of loss points of the optical fiber 6 in the longitudinal direction and detects a vibration point of the optical fiber 6 in the longitudinal direction in accordance with the instruction from the set terminal.

(Effects)

The measurement dynamic range is extended. Therefore, a long-distance optical fiber line test can be performed. In addition, distances to a plurality of abnormal facilities can be detected.

It is practicable to detect a plurality of failure positions of any failure case such as breakage, bending, reflection, or bending due to water immersion.

It is practicable to detect a strike on anything such as a manhole, a utility pole, or a closure in the manhole and to simplify on-site breakdown facility comparison.

When a wall or the like is struck, it is practicable to compare with an internal wiring such as a customer's house.

The above measurement can be performed by one measuring instrument and can be determined by a single output.

Owing to the above effect, it is practicable to greatly reduce the operation such as detection and repair of abnormal facility of the optical fiber line.

The comparing result is transmitted to a set terminal such as a smart phone or a tablet and displayed thereon, so that it can be confirmed even at the site where the impact is made.

INDUSTRIAL APPLICABILITY

The present disclosure can be applied to the information communication industry.

REFERENCE SIGNS LIST

1 Light source
2 Optical coupler
3 Modulator
4 Amplifier
5 Circulator
6 Optical fiber
7 Control unit
8 Balance PD
9 Digitalization means
10 Computing machine
11 Display unit

The invention claimed is:

1. An optical line test system comprising:
   detecting a distribution of possible loss points of an optical line in a longitudinal direction, using a coherent light measurement device;
   applying vibration to facility disposed on a path of the optical line;
   detecting a vibration point of the optical line in a longitudinal direction upon applying the vibration, using the coherent light measurement device;
   comparing the vibration point to the distribution of possible loss points; and
   identifying the loss point based on correspondence between the vibration point and the distribution of possible loss points.

2. The optical line test system according to claim 1, wherein
   the coherent light measurement device is an optical time domain reflectometer (OTDR) for performing coherent detection, and the device for
   measuring the distribution of possible loss points by time-averaging a plurality of backscattered light waveforms obtained by a plurality of light pulses, and measuring the vibration point by arranging the plurality of backscattered light waveforms obtained by the plurality of light pulses in accordance with time series.

3. The optical line test system according to claim 1, wherein the facility is at least one of a closure, a utility pole, or a manhole.

4. The optical line test system according claim 1, wherein
   the coherent light measurement device displays the vibration point of the optical line, in the longitudinal direction, on the distribution of possible loss points of the optical line in the longitudinal direction.

5. The optical line test system according to claim 1, wherein
   the coherent light measurement device transmits at least one of a detection result of the loss point and the vibration point or a result of the identifying to a set terminal.

6. The optical line test system according to claim 5, wherein
   the coherent light measurement device performs at least one of detection of the distribution of possible loss points of the optical line in a longitudinal direction, and detection of the vibration point of the optical line in the longitudinal direction, in accordance with an instruction from a set terminal.

7. A coherent light measurement device that is a coherent OTDR for performing coherent detection, the device for
   measuring a distribution of possible loss points by time-averaging a plurality of backscattered light waveforms obtained by a plurality of light pulses,
   measuring the vibration point by arranging the plurality of backscattered light waveforms obtained by the plurality of light pulses in accordance with time series,
   comparing the vibration point to the distribution of possible loss points; and
   determining whether the distribution of possible loss points and the vibration point correspond or do not correspond.

8. An optical line test method comprising:
   detecting a distribution of possible loss points of an optical line in a longitudinal direction, using a coherent light measurement device;
   applying vibration to facility disposed on a path of the optical line;
   detecting a vibration point of the optical line in a longitudinal direction upon applying the vibration, using the coherent light measurement device;
   comparing the vibration point to the distribution of possible loss points; and
   identifying the loss point based on correspondence between the the vibration point and the distribution of possible loss points.

* * * * *